LOGICAL SWITCHING SYSTEM FOR INPUT AND OUTPUT SIGNALS CHARACTERIZED BY VARIOUS STABLE FREQUENCIES

Filed Feb. 19, 1962 5 Sheets-Sheet 1

INVENTORS.
ROBERT T. ADAMS
BY BARRY M. MINDES
Robert Lieber
ATTORNEY

LOGICAL SWITCHING SYSTEM FOR INPUT AND OUTPUT SIGNALS CHARACTERIZED BY VARIOUS STABLE FREQUENCIES

Filed Feb. 19, 1962

INVENTORS.
ROBERT T. ADAMS
BARRY M. MINDES

BY Robert Lieber

ATTORNEY

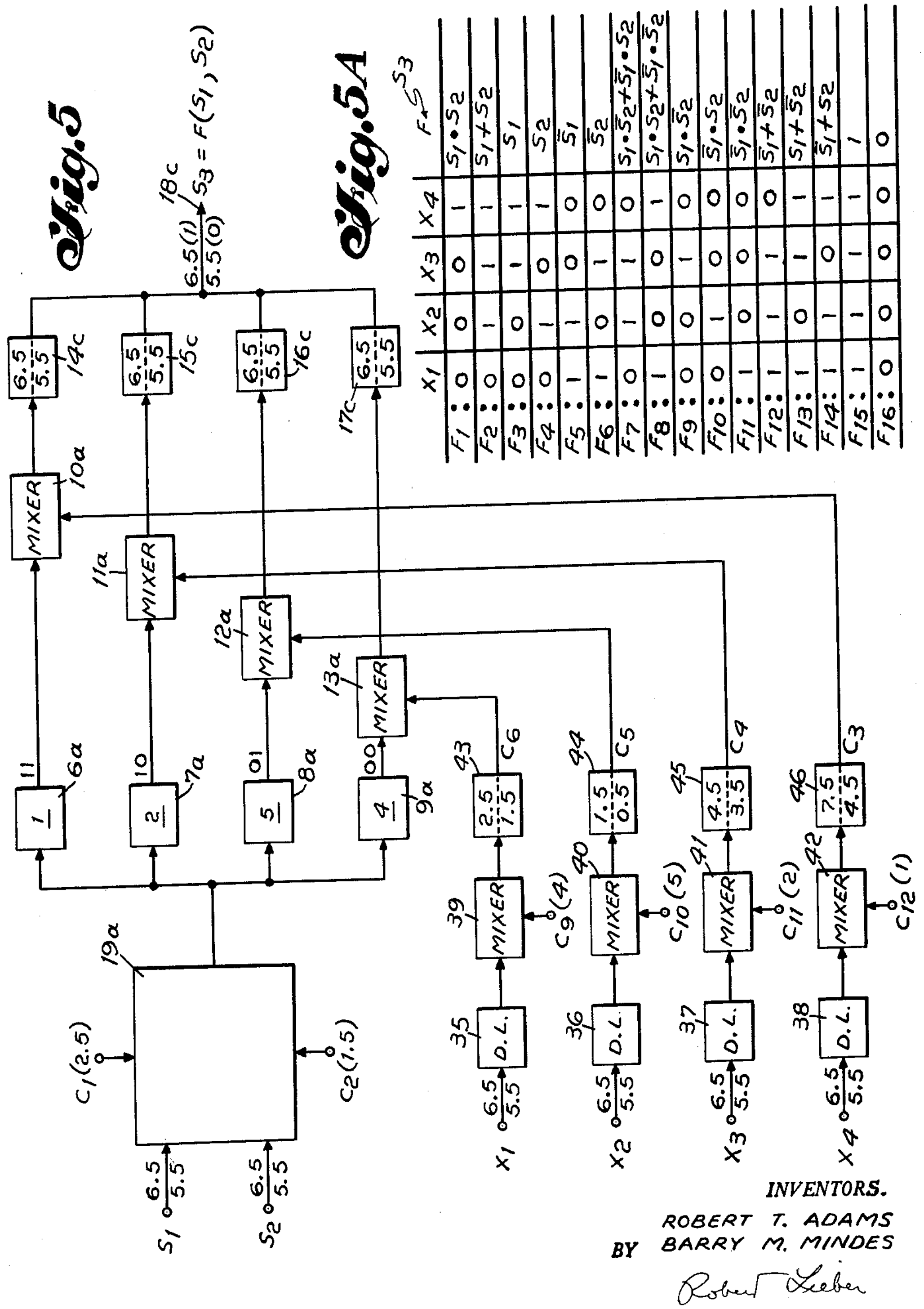

Fig. 5, Fig. 5A

| | $X_1$ | $X_2$ | $X_3$ | $X_4$ | $F \rightarrow S_3$ |
|---|---|---|---|---|---|
| $F_1$: | 0 | 0 | 0 | 1 | $S_1 \bullet S_2$ |
| $F_2$: | 0 | 1 | 1 | 1 | $S_1 + S_2$ |
| $F_3$: | 0 | 0 | 1 | 1 | $S_1$ |
| $F_4$: | 0 | 1 | 0 | 1 | $S_2$ |
| $F_5$: | 1 | 1 | 0 | 0 | $\bar{S}_1$ |
| $F_6$: | 1 | 0 | 1 | 0 | $\bar{S}_2$ |
| $F_7$: | 0 | 1 | 1 | 0 | $S_1 \bullet \bar{S}_2 + \bar{S}_1 \bullet S_2$ |
| $F_8$: | 1 | 0 | 0 | 1 | $S_1 \bullet S_2 + \bar{S}_1 \bullet \bar{S}_2$ |
| $F_9$: | 0 | 0 | 1 | 0 | $S_1 \bullet \bar{S}_2$ |
| $F_{10}$: | 0 | 1 | 0 | 0 | $\bar{S}_1 \bullet S_2$ |
| $F_{11}$: | 1 | 0 | 0 | 0 | $\bar{S}_1 \bullet \bar{S}_2$ |
| $F_{12}$: | 1 | 1 | 1 | 0 | $\bar{S}_1 + \bar{S}_2$ |
| $F_{13}$: | 1 | 0 | 1 | 1 | $S_1 + \bar{S}_2$ |
| $F_{14}$: | 1 | 1 | 0 | 1 | $\bar{S}_1 + S_2$ |
| $F_{15}$: | 1 | 1 | 1 | 1 | 1 |
| $F_{16}$: | 0 | 0 | 0 | 0 | 0 |

INVENTORS.
ROBERT T. ADAMS
BY BARRY M. MINDES
Robert Lieber
ATTORNEY

March 30, 1965 R. T. ADAMS ETAL 3,176,233

LOGICAL SWITCHING SYSTEM FOR INPUT AND OUTPUT SIGNALS CHARACTERIZED BY VARIOUS STABLE FREQUENCIES

Filed Feb. 19, 1962 5 Sheets-Sheet 4

INVENTORS.
ROBERT T. ADAMS
BY BARRY M. MINDES
Robert Lieber
ATTORNEY

March 30, 1965 R. T. ADAMS ETAL 3,176,233

LOGICAL SWITCHING SYSTEM FOR INPUT AND OUTPUT SIGNALS CHARACTERIZED BY VARIOUS STABLE FREQUENCIES

Filed Feb. 19, 1962 5 Sheets-Sheet 5

INVENTORS.
ROBERT T. ADAMS
BY BARRY M. MINDES
Robert Lieber
ATTORNEY 3,176,233

LOGICAL SWITCHING SYSTEM FOR INPUT AND OUTPUT SIGNALS CHARACTERIZED BY VARIOUS STABLE FREQUENCIES

Robert T. Adams, Short Hills, and Barry M. Mindes, Fort Lee, N.J., assignors to International Telephone and Telegraph Corporation, Nutley, N.J., a corporation of Maryland Filed Feb. 19, 1962, Ser. No. 173,886
5 Claims. (Cl. 328—92)

This invention relates generally to logical switching and selecting systems and particularly to a switching system wherein the only variable conditions are the frequencies of the input, control, and output signals.

There are many known systems for generating the basic logical switching functions of a plurality of variables, such as, for example, the functions of conjunction, disjunction and negation (AND, OR, and NOT). In the known systems, however, the varying signal parameter is either the signal amplitude, or phase. That is, the input and output signals are capable of assuming either a plurality of stable amplitude conditions, or a plurality of stable phase conditions. It is our discovery that a number of important system advantages accrue when switching or selecting circuits are designed to operate solely on signal frequencies, and the input and output signals are constrained to vary solely in frequency between a plurality of given stable frequency conditions. One such advantage is that, at very high frequencies, the design of wide-band switching circuits, in accordance with the inventive principles to be enunciated below, is far simpler than the design of corresponding circuits for amplitude and/or phase switching. Further, the present invention affords a wide range of variation through a multiplicity of readily distinguishable stable conditions in contrast to prior-art noise-sensitive arrangements. Still further, in one particular aspect of this invention, a highly versatile switching circuit is provided as will be clear from the discussion given below.

It is therefore a general object of this invention to provide a logical switching system for producing output signals which vary in frequency between $m^n$ stable frequency states in accordance with a basic switching function of $n$ variables each of which is capable of assuming $m$ stable frequency states.

It is another object of this invention to provide a logical switching system in which a single basic circuit arrangement is capable of providing an output signal which varies through $m^n$ possible stable frequency states in accordance with any one of a plurality of basic switching functions of $n$ input variables each of which is capable of assuming $m$ stable frequency states.

Another object is to provide a selection system for effectively coupling one of $m^n$ information input channels to an output terminal, in accordance with the combined states of a plurality of selection control inputs, wherein the only variable aspect of the information input signals and the selection control input signals is that each signal is capable of assuming $m$ different stable frequency states.

It is a specific object of this invention to provide a logical switching system in which a single basic circuit arrangement is capable of providing an output signal which varies between two stable frequency states in accordance with any one of sixteen possible basic switching functions of $n$ input variables each of which is capable of assuming the same two stable frequency states associated with the output signal.

According to one particular aspect of the present invention, a highly versatile switching arrangement has been devised which, in association with the combined condition of a plurality of variable-frequency control inputs is capable of providing an output signal frequency which varies as a corresponding predetermined switching function of a plurality of intelligence signal inputs. The same circuit arrangement is coincidentally useful for, in effect, selectively coupling one of the above mentioned control input signal frequencies to the output, in response to the combined frequency conditions of signals applied to the intelligence signal input channels. Thus, the circuit represents a highly versatile switching or selecting system arrangement.

These and other objects and features of the present invention may be more fully appreciated when considered in connection with the following description made in connection with the accompanying drawings, wherein.

Figures 1, 2:
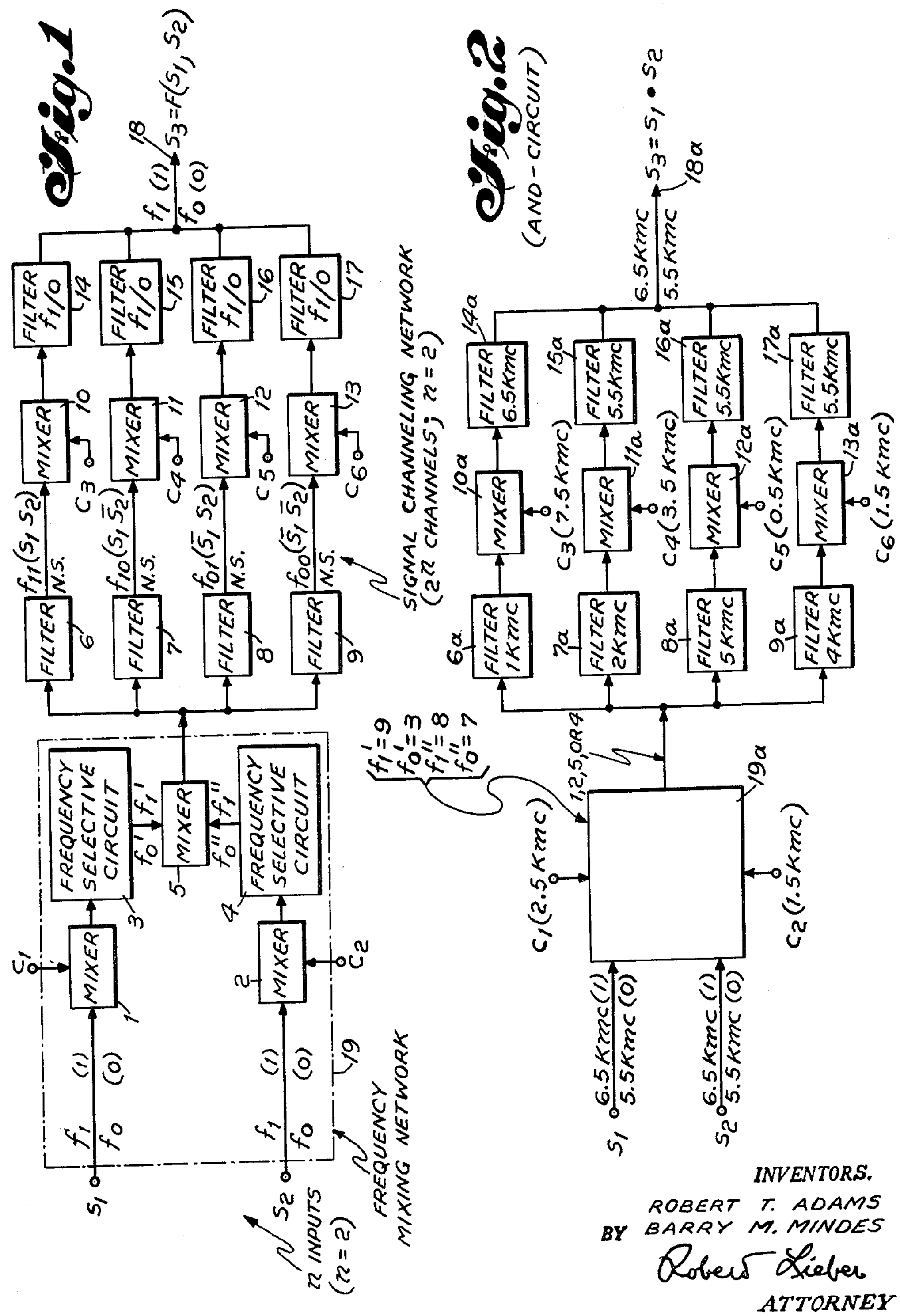
FIG. 1 is a circuit block diagram characteristic of the basic arrangement of this invention as applied to two switching inputs exhibiting binary variable frequencies.
FIG. 2 is a circuit block diagram which illustrates exemplary frequency values suitable for use in the general arrangement of FIG. 1, to provide the equivalent of an AND-circuit.
Figure 3:
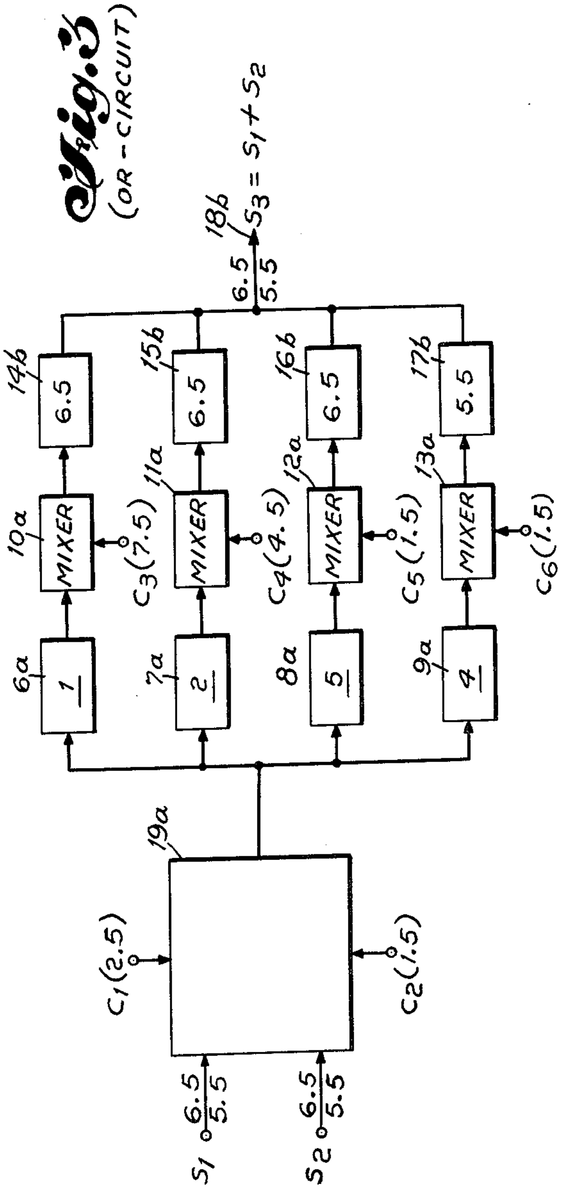
FIG. 3 is a circuit block diagram illustrating an exemplary set of values for producing an OR-circuit operation in the circuit of FIG. 1.
Figure 4:
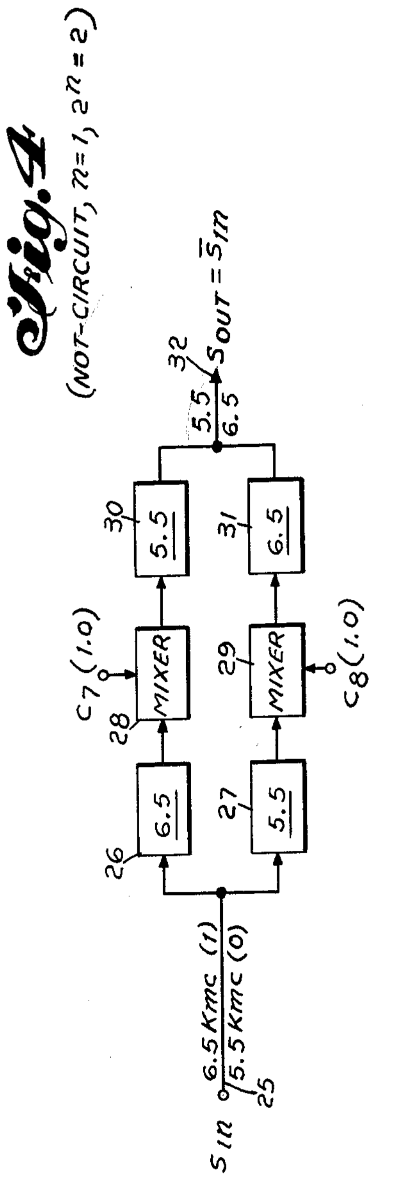
FIG. 4 is a basic NOT-circuit illustrating an arrangement for producing the binary complement of an input signal in accordance with the invention.
Figure 6:
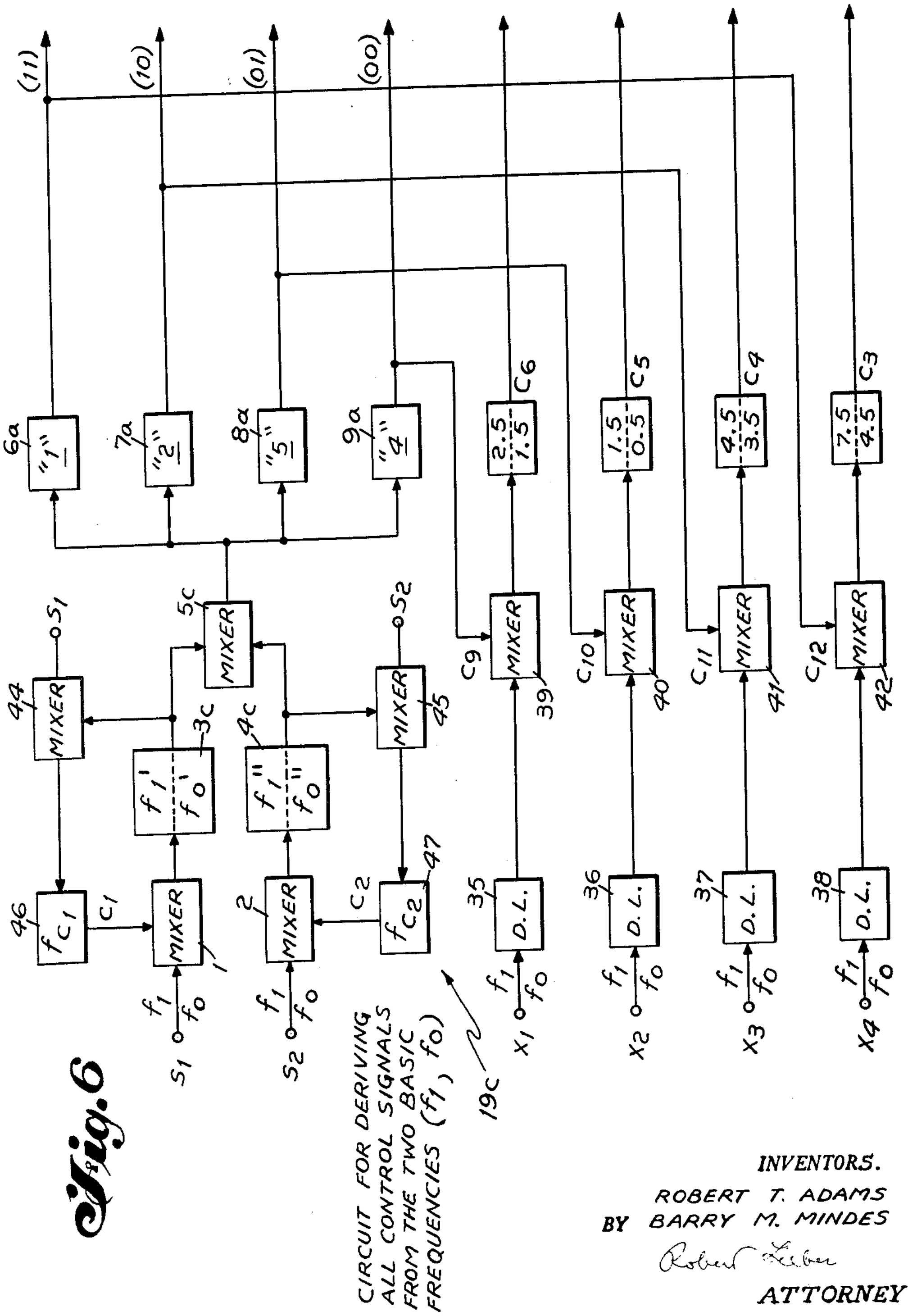
Figure 7:
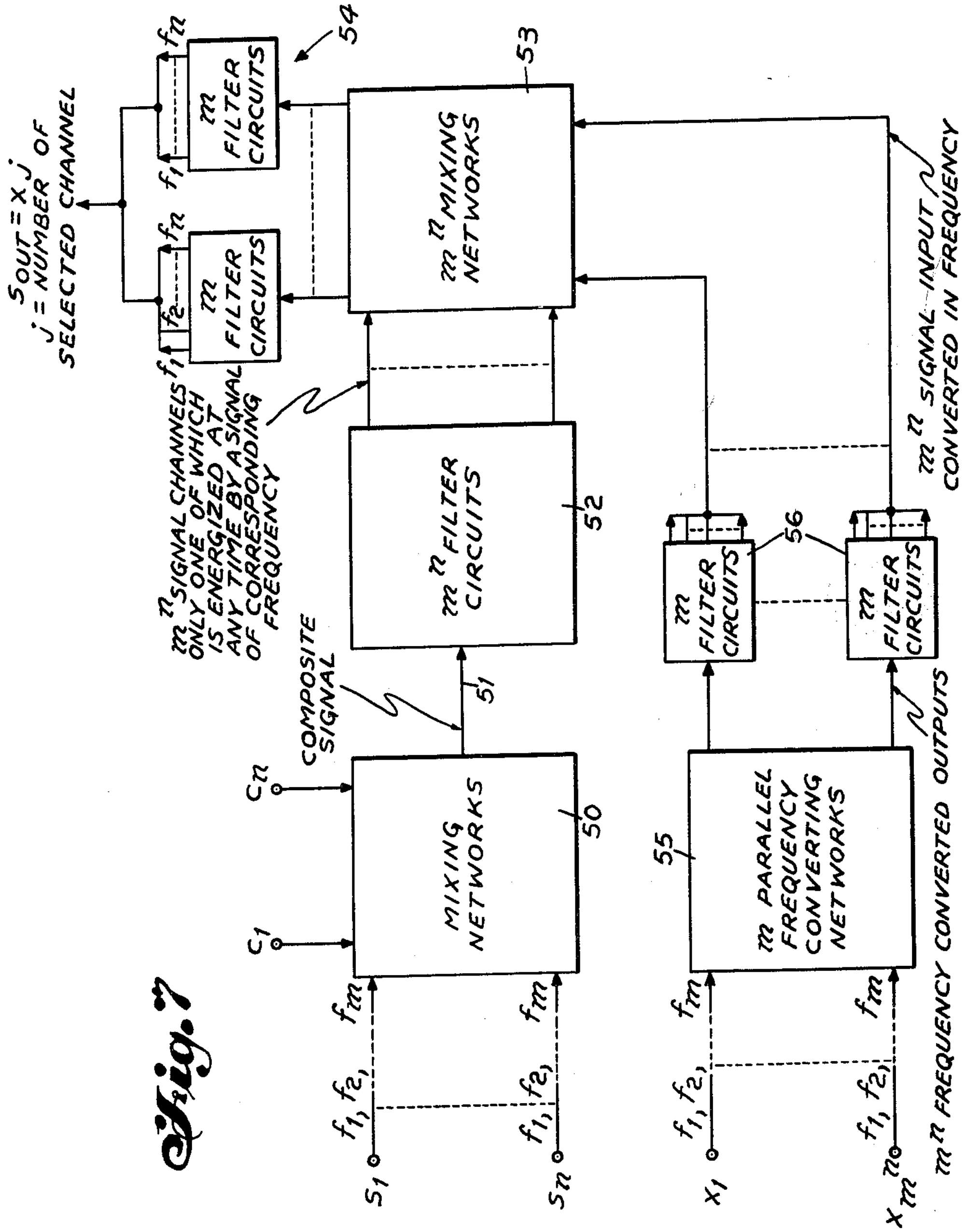

FIG. 5 is a block diagram of a circuit arrangement employing the values given in connection with FIGS. 2–4, and illustrating the use of a plurality of control signal sources each of which may be conditioned to the same stable binary frequency conditions associated with the input intelligence, and which are combined with the input intelligence in such a way as to provide, in effect, any one of the sixteen basic binary switching functions defined in the table of FIG. 5A;

FIG. 6 is a circuit block diagram illustrating a method of providing all of the control signals required for the operation of the circuit of FIG. 5 from the two basic stable frequencies associated with the input and output signals;

FIG. 7 is a general block diagram illustrating the general application of the present invention to the selection of one of $m^n$ $m$-stable frequency signal inputs in association with $n$ $m$-stable frequency selection inputs, or to the production of an $m$-stable frequency output signal related to $n$ $m$-stable frequency inputs by any one of a multiplicity of switching functions associated with the combined conditions of $m^n$ control inputs.

Referring to FIG. 1, there is shown therein a general arrangement in accordance with the present invention for operating upon $n$ input signals, each of which is capable of assuming $m$-stable frequency states, to produce an output signal, which is capable of ranging through the same $m$ stable frequency states, in accordance with a predetermined switching function of the input variables. In the particular embodiment shown in FIG. 1, both $m$ and $n$ are taken to be 2 so as to simplify the discussion, the extension of the description to general integers $m$ and $n$ being reserved for subsequent consideration below. Thus, in FIG. 1, two sources $S_1$ and $S_2$, of input signals, which individually vary between two given stable frequency states, $f_1$ and $f_0$, are indicated. Sources such as the sources $S_1$ and $S_2$ designated in FIG. 1 which are capable of assuming two or more stable frequency states may for example comprise the well known multimode oscillators, which are shown and fully described in the IRE Transactions on Circuit Theory of March 1955, in an article on pp. 58–66, entitled "Frequency Memory in Multimode Oscillators," by W. A. Edson.

In FIG. 1, the stable frequency conditions $f_1$ and $f_0$ may be viewed as representative of binary 1 and 0 conditions, as denoted by the respective (1) and (0) indications above and below the input leads. The input signals from source $S_1$ and $S_2$ are applied to respective mixers 1 and 2 which are respectively supplied with control input signals $C_1$ and $C_2$ each of a given frequency and amplitude. The output of mixer 1 is coupled to frequency-selective circuit 3 which serves to selectively pass one of the beat-frequency signal components (either the sum or difference) produced by the mixing of the signals $S_1$ and $C_1$ for each possible frequency state ($f_1$ and $f_0$) of the signal $S_1$. Thus, at the output of circuit 3, a signal of converted frequency $f_1'$ or $f_0'$ is obtained depending respectively upon whether the frequency of $S_1$ is $f_1$ or $f_0$. Similarly, the output of mixer 2 is coupled to a circuit 4 which produces a signal at a converted frequency $f_1''$ or $f_0''$, for $S_2$ respectively equal to $f_1$ or $f_0$, the frequencies $f_1''$ and $f_0''$ being distinct from each other and from the frequencies $f_1'$ and $f_0'$, as well as from the basic frequencies $f_1$ and $f_0$.

The outputs of circuits 3 and 4 are coupled to a mixing circuit 5 which serves to produce one and only one of four possible composite signals, this composite signal containing one and only one of four different frequency components which are thus uniquely determined by the combinations of the frequencies of input signals $S_1$ and $S_2$. The output of mixer 5 is applied to four filter networks including frequency selective elements 6–9 which serve to extract the aforesaid four different frequency components from the corresponding composite signals. The frequencies of the outputs of the filters 6–9 may thus be designated $f_{11}$, $f_{10}$, $f_{01}$, and $f_{00}$, respectively, to indicate their correspondence to the associated combined states of the signals $S_1$ and $S_2$ as indicated in parentheses next to the frequency designation. The indication NS below the output of each filter circuit 6–9 represents the state "no signal," as the unique signal component at the output of mixer 5 is passed through one and only one of the filters 6–9.

The outputs of filters 6–9 are respectively mixed with control signals $C_3$–$C_6$ in mixing circuits 10–13, so that at any given time the output of one and only one of the circuits 10–13 will include a frequency component at either the frequency $f_1$, or the frequency $f_0$, depending upon the required switching function. This output is passed through a corresponding one of the frequency-selective networks 14–17 to a common output 18 as an output signal $S_3$, which is thus representative of either a binary 1 or 0 condition depending upon the associated passed frequency component.

Summarizing, it may be appreciated that the circuits 1–5 designated as a group within the dotted line block 19, serve to produce in response to the combined frequency conditions of the sources $S_1$ and $S_2$ an output signal including one and only one of four different frequency components which correspond to the four possible combined states of the sources $S_1$ and $S_2$. The associated component is thus passed through one and only one of the frequency selective channels 6–9 to an associated one of four mixing circuits 10–13 where it is mixed with an associated one of four control signals $C_3$–$C_6$ to produce a composite signal including a frequency component at one of the binary stable input states $f_1$ or $f_0$. This component is coupled thru a corresponding one of the four frequency-selective networks 14–17 to output terminal 18 as the required output signal $S_3$ which thus assumes the frequency states corresponding to binary 1 and 0 conditions in accordance with a binary switching function of the inputs $S_1$ and $S_2$ as determined by the frequency of the corresponding one of the control signals $C_{3-6}$.

The mixers 1 and 2 are usually required to ensure sufficient separation in frequency between the four possible "unique" output frequency components of mixer 5. However, as will be clear from the discussion of the NOT-circuit of FIG. 4 below, conversion of the basic input frequencies prior to application thereof to frequency selective channels, may not be necessary, in given instances.

It is thus clear that in the basic arrangement of FIG. 1 the frequencies of the input signals are first converted and thereafter combined in a mixer so as to provide a composite signal including one and only one of four possible frequencies which differ not only from each other but also from the stable frequencies associated with the input signals, so that the output of the associated filters 6–9, when combined with the associated one of the control signals $C_3$–$C_6$ in the corresponding one of the mixers 10–13, is a signal including a frequency component at one of the stable input frequencies, in which case the output signal represents a true switching function of the inputs in the sense that its varying parameter (frequency) is the same as that of the inputs and it varies in accordance with the desired switching function determined by the control signals $C_3$–$C_6$. Suitable stable frequency values for the 1 and 0 states are, for example, 6.5 kmc. and 5.5 kmc. (kmc. being used as an abbreviation for kilomegacycles), respectively. Under these conditions, appropriate values for the control signals $C_1$ and $C_2$ are respectively 2.5 kmc. and 1.5 kmc., so that the corresponding values of the signals $f_1'$, $f_0'$, $f_1''$, and $f_0''$ may, for example be 9, 3, 8 and 7 kilomegacycles respectively. Accordingly, the four unique frequencies associated with the frequency combinations 9–8, 9–7, 3–8, and 3–7, may for example be 1 kmc., 2 kmc., 5 kmc., and 4 kmc., respectively, these corresponding respectively to the binary input condition combinations $S_1 S_2$ (11), $S_1 \overline{S}_2$ (10), $\overline{S}_1 S_2$ (01), and $\overline{S}_1 \overline{S}_2$ (00). Referring to FIG. 2, if the above specific frequency values are employed, it is clear that one and only one of the filters 6a–9a will pass a signal at any given time. Further, if the signals $C_3$–$C_6$ are respectively 7.5, 3.5, 0.5 and 1.5 kmc. signals, as shown in FIG. 2, then one and only one of the mixers 10a–13a will provide an output frequency component at one of the basic stable input frequencies (in this instance, 6.5 or 5.5 kmc.). Accordingly, filter circuits 14a–17a are respectively coupled to mixing circuits 10a–13a to extract the associated output frequency component which, for the indicated input values will be 6.5 kmc. for filter 14a and 5.5 kmc. for filters 15a–17a.

In operation, therefore, when $S_1$ and $S_2$ are both in the binary 1 condition (6.5 kmc.), filter 6a passes a 1 kmc. signal to mixer 10a which combines the passed signal with a 7.5 kmc. control signal $C_3$ to produce a signal including a 6.5 kmc. component which is passed to the output terminal 18a. For the other three possible input conditions of signals $S_1$ and $S_2$, one of the circuits 7a–9a passes a signal which, when mixed with the corresponding one of the control signals $C_4$–$C_6$, yields a composite signal at the output of the associated one of mixers 11a–13a. This composite signal includes a 5.5 kmc. component which will pass through the associated 5.5 kmc. filter to the output. Thus, the output is a 5.5 kmc. signal unless both inputs are 6.5 kmc. signals, and in the latter instance the output is a 6.5 kmc. signal (binary1), and therefore it is clear that the circuitry of FIG. 2 represents an AND-circuit.

Similarly, FIG. 3 employing frequency values corresponding to those shown in FIG. 2, with different control signals $C_3$–$C_6$ represents an OR-circuit. In FIG. 3, $C_3$–$C_6$ are assigned the respective frequency values 7.5, 4.5, 1.5, and 1.5 kmc., and, the filter networks 14a–17a (of FIG. 2) are replaced by networks 14b–17b which respond respectively to 6.5, 6.5, 6.5, and 5.5 kmc. signals. Thus, the output 18b is always at 6.5 kmc. (binary 1) unless both of the inputs $S_1$ and $S_2$ are at 5.5 kmc. (OR-condition).

In FIG. 4, a NOT-circuit is shown. As previously noted, this circuit is considerably simpler than the above-discussed AND and OR circuit arrangements. Specifically, no frequency conversion is required prior to the insertion of the input signal into the associated one and only one of the frequency selective output channels. More specifically, in FIG. 4 the signal at the input 25 is applied directly to frequency selective networks 26 and 27 without prior frequency conversion. Thereafter, the outputs of networks 26 and 27 are respectively coupled through mixers 28 and 29 to frequency selective networks 30 and 31, respectively. The control signals $C_7$ and $C_8$ applied to the mixers 28 and 29 are such as required to produce a unique one of the two possible input signal frequencies as a component at the output. Again specifically, if the input signal $S_{in}$ at terminal 25 is capable of assuming the frequency 6.5 kmc. or 5.5 kmc. depending upon whether it is in the binary 1 or 0 condition, respectively, then for a binary 1 input, the circuit 26 will pass a 6.5 kmc. signal through mixer 28 which, when mixed with the 1.0 kmc. control input $C_7$ results in a composite signal including a frequency component of 5.5 kmc. which is passed to the output terminal 32 as the required complementary binary 0 output. During the same interval of time, the channel including circuits 27, 29, and 31 remains relatively unenergized, since the output of mixer 29 does not include a 6.5 kmc. component. On the other hand, if the input assumes the state binary 0, a 5.5 kmc. signal is passed to mixer 29 where it is mixed with a 1.0 kmc. signal to provide a composite signal including a 6.5 kmc. (binary 1) complementary frequency component as required, which component is passed through frequency selective network 31 to output terminal 32.

Referring to FIG. 5, one of the more important advantageous aspects of the present invention may now be appreciated by considering the arrangement shown therein in relation to any of the arrangements previously discussed. In FIG. 5, the upper half of the circuit including the frequency converting arrangement 19a, the frequency selective channels 6a–9a, and the associated mixers 10a–13a, respectively, are substantially identical to the corresponding elements considered in connection with the discussion of FIG. 2. What is different, however, is that the output frequency selective channels 14–17, which are now distinguished by the subscript c, are each capable of passing two signal frequency components corresponding to binary frequency conditions of the control inputs, $C_3$–$C_6$ which are each at one of two predetermined frequencies, rather than a constant frequency as implied throughout the previous discussions. The advantage of this is that the arrangement of FIG. 5 now may be conditioned to provide at the output 18c a signal $S_3$ which may represent any one of a plurality of different switching functions of the input signals $S_1$ and $S_2$.

Considering the specific frequency values previously employed in the arrangements of FIGS. 2–4, the control signal $C_6$ is derived from a control input signal $X_1$ which assumes one of the two stable frequency states associated with the binary 1 and 0 conditions. Similarly, the control signal $C_5$ is derived from a binary input $X_2$, $C_4$ is derived from a binary input $X_3$, and $C_3$ is derived from a binary input $X_4$. The binary control inputs $X_1$–$X_4$ are coupled through respective delay networks 35–38 to corresponding mixers 39–42, where the output frequencies thereof are mixed with associated control signals $C_9$–$C_{12}$ having respective frequencies 4 kmc., 5 kmc., 2 kmc., and 1 kmc. which, it is incidentally noted, are identical to the respective frequencies transferred by the filters 9a, 8a, 7a, and 6a to the respective mixing networks 13a–10a.

The outputs of the mixing networks 39–42 are coupled to frequency selective networks 43–46 each of which thus passes one and only one of two possible frequency components to the corresponding control lead associated with the signals $C_6$–$C_3$. Thus, if $X_1$ is in the binary 1 condition, a 6.5 kmc. signal will pass through delay network 35 to mixer 39 where, after mixing with the 4 kmc. signal $C_9$, the composite output includes a frequency component of 2.5 kmc. which is applied to the signal $C_6$ to the mixer 13a. On the other hand, if $X_1$ is in the 0 condition, then a 5.5 kmc. signal will pass through network 35 to mixer 39, so that a 1.5 kmc. signal will be isolated by the network 43 and applied to mixer 13a. Similarly, if $X_2$ is respectively in the 1 or 0 condition, $C_5$ will respectively assume the frequency state 1.5 kmc. or 0.5 kmc., and if $X_3$ is respectively in the 1 or 0 condition, $C_4$ will assume the frequency condition 4.5 kmc. or 3.5 kmc., and if $X_4$ is in the respective 1 or 0 condition, then $C_3$ will assume the condition 7.5 or 4.5 kmc., respectively. Since one and only one of the frequency selective networks 6a–9a passes a signal at any given time, it may be appreciated that one and only one of the mixing circuits 10a–13a will produce an output which includes a frequency component within the range of the associated one of the frequency selective networks 14c–17c. More particularly, in view of the fact that $C_6$ can only be at the frequency 2.5 or 1.5 kmc., the output of mixing network 13a will include a frequency component at 6.5 or 5.5 kmc. only when circuit 9a passes a signal at frequency 4 kmc., the latter condition occurring only when both of the inputs $S_1$ and $S_2$ are in the binary 0 conditions. Similarly, it may be shown that a signal will be passed through network 16c only when the inputs $S_1$ and $S_2$ are in the binary 0 and 1 conditions, respectively, that network 15c will pass a signal only when inputs $S_1$ and $S_2$ are respectively in their binary 1 and 0 conditions, and that network 14c will pass a signal only when both of the inputs $S_1$ and $S_2$ are simultaneously in the binary 1 condition.

From the truth table given in FIG. 5, it may be appreciated that any one of the 16 basic binary switching functions of the inputs $S_1$ and $S_2$ is available at the output depending upon the combined conditions of the control inputs $X_1$–$X_4$. For example, the first row entry in the table indicates that if the control inputs $X_1$–$X_4$ are in the respective states 0001, the output $S_3$ represents the switching functions $S_1 . S_2$, where the dot indicates conjunction (read "$S_1$ AND $S_2$"). Again by way of example, if the entries in the second row of the table are inspected, it may be noted that if the input $X_1$–$X_4$ assume the states 0111 coincidentally, the output $S_3$ is related to the inputs by the following expression $$S_3 = S_1 + S_2$$

(read "$S_1$ OR $S_2$"). Further, if the control inputs are as shown in the fifth row entry of the table in the state 1100, the output will be $\overline{S}_1$ (read "NOT $S_1$"). Thus, any one of the 16 basic switching functions may be produced at the output depending upon the state of the control inputs $X_1$–$X_4$.

The row entries in the table in FIG. 5a are identified by the function designations $F_1$–$F_{16}$ to permit convenient reference thereto. In connection with the entries $F_1$, $F_9$, $F_{10}$, and $F_{11}$ another advantageous aspect of the arrangement of FIG. 5 may be appreciated. It may be recalled that, depending upon the combined states of the inputs $S_1$ and $S_2$, one and only one of the networks 6a–9a will pass a signal which when mixed with the corresponding input to the associated one of the mixers 10a–13a will produce a signal having a frequency component in the range of the corresponding output frequency selective network. Accordingly, it may be appreciated that if, for example, the inputs are both in the state binary 1, then regardless of the conditions of the control signals $X_1$–$X_3$, the output $S_3$ will depend solely on the control signal $X_4$. If $X_4$ is in the condition binary 1, the output will also be in the condition binary 1 (6.5 kmc.), and so forth. Similarly from entry $F_9$, it may be seen that if $S_1$ and $S_2$ are in the respective states 1 and 0, the output $S_3$ will depend solely on the (control)

input $X_3$, and will be in the condition 1 or 0 depending respectively upon whether the control input $X_3$ is in the 1 or 0 frequency condition. Thus, the combined states of the inputs $S_1$ and $S_2$, in effect, may be used to selectively couple one and only one of the control inputs $X_1$–$X_4$ to the output channel $S_3$, and therefore the circuit which hitherto has been considered as a switching function arrangement may also be viewed as a selecting circuit arrangement.

It is further noted that the delay lines 35–38 of FIG. 5 are only used to compensate for the expected delays of the input signals $S_1$ and $S_2$ through the mixing circuits of the frequency conversion arrangement 19*a*, as it may be appreciated that at the high kmc. frequencies involved, any slight delay in passage of a signal through a cascaded mixing network, can result in an erroneous output. By properly delaying the control signals $X_1$–$X_4$ relative to the signals propagating through the circuit 19*a* and the associated channels *6a–9a*, the signals mixed in mixers 10*a*–13*a* may therefore be properly synchronized.

Referring to FIG. 6, an arrangement for deriving all of the control signals employed in the arrangement of FIG. 5 from the two basic signal frequencies $f_1$ and $f_0$ corresponding to the 1 and 0 conditions, respectively (6.5 kmc. and 5.5 kmc., for example), is shown. Specifically, it is noted that the control signals $C_9$–$C_{12}$ applied to the mixing circuits 39–42 of FIG. 5 are derived from the outputs of the corresponding filter channels *9a–6a*, respectively. Similarly, the outputs of the frequency selective networks 3*c* and 4*c*, included within the frequency converting block 19*c*, are shown as being coupled through respectively associated mixing circuits 44 and 45, where they are respectively mixed with the input signals $S_1$ and $S_2$, and applied to frequency selective networks 46 and 47 which serve to respectively filter out the required control frequency components $C_1$ and $C_2$. Thus, the control signals $C_1$ and $C_2$ may be derived directly from the basic input signals $S_1$ and $S_2$.

Referring now to FIG. 7, this illustrates the general applicability of the present arrangement, particularly the arrangement shown in FIG. 5, to the handling of $n$ input signals $S_1$–$S_n$ and $m^n$ control signals $X_1$–$X_mn$, to produce an output which may be viewed as either the required switching function of the inputs $S_1$–$S_n$, or as a selected one of the signals $X_1$–$X_mn$ in accordance with the combined conditions of the signals $S_1$–$S_n$, where the signals $S_1$–$S_n$, $X_1$–$X_mn$, and the output S out, are each capable of ranging through $m$ stable frequency states. In FIG. 7, the extension of the circuit of FIG. 5 to handle the general collection of inputs $S_1$–$S_n$, $X_1 \ldots X_mn$ includes a block 50 which is coupled to the inputs $S_1 \ldots S_n$ and to corresponding control inputs $C_1 \ldots C_n$. Each of the inputs $S_1, \ldots, S_n$ is capable of assuming any one of $m$ stable frequency states indicated as $f_1, f_2, \ldots f_m$. The signals $S_1, \ldots S_n$ are respectively mixed with the signals $C_1, \ldots, C_n$ to produce $n$ composite signals at frequencies so determined that when mixed by means not shown in the block 50, but which are deemed obvious in view of the discussion of the preceding figures, the output composite signal at 51 includes one and only one of $m^n$ possible different frequencies, which are characteristic of the $m^n$ possible combinations of stable frequency conditions of the inputs $S_1 \ldots, S_n$. The aforementioned unique signal component which is thus produced is extracted by means of an appropriate one of $m^n$ parallel filter circuits indicated generally at 52, and the corresponding filter circuit output is coupled to an associated one of $m^n$ mixing networks indicated generally at 53 where the selected filter output is mixed with a corresponding one of $m^n$ control signal inputs derived from a corresponding one of $m^n$ (control) signal inputs $X_1 \ldots, X_mn$. The output of the associated mixing network, and only that network, will then include a signal component at one of the $m$ basic frequencies $f_1, f_2 \ldots f_m$. The said frequency component is then extracted by means of a corresponding block of $m$ parallel filter circuits, $m^n$ such filter circuit blocks being indicated generally at 54, to produce an output which may be viewed either as a given multilevel switching function of the inputs $S_1, \ldots S_n$ or, as a selection of the signal input $X_j$ in response to an appropriate selection combination of the inputs $S_1, \ldots, S_n$. The control signals $X_j$ are indicated as being passed through $m^n$ parallel frequency-converting networks indicated generally at 55, the outputs of which are filtered through $m^n$ banks of parallel filter circuits each including $m$ filter channels corresponding to the associated converted frequency, the filter banks being indicated generally at 56, thereby supplying the required $m^n$ control signal inputs to the mixing networks 53.

It should thus be clear that the arrangements considered in connection with FIGS. 1–5 are adapted to a wide range of applications within the contemplated scope, and accordingly, while we have shown and described specific aspects of our invention, it is to be understood that this description is made only by way of example, and not as a limitation to the scope of the invention as set forth in the objects thereof and in the accompanying claims.

Accordingly we claim:

1. A logical AND-circuit comprising:
two sources of information signals each capable of assuming first and second stable frequency states corresponding respectively to binary one and zero conditions,
means coupled to said sources for producing a composite signal including a predetermined signal component at one and only one of four given discrete frequencies, in accordance with the combined frequency states of said sources,
four frequency selective networks coupled to said last-mentioned means for filtering out associated ones of said predetermined signal components,
four control signal sources,
and means coupled to said frequency selective networks and said control signal sources for converting the frequency of said filtered signal component which is produced in response to the coincident presence of said first stable frequency at the outputs of both said information signal sources, to said first stable frequency, and for converting the frequencies of all of said other filtered signal components to said second stable frequency.

2. A logical OR-circuit comprising:
two sources of information signals each capable of assuming first and second stable frequency states corresponding respectively to binary one and zero conditions,
means coupled to said sources for producing a composite signal including a predetermined signal component at one and only one of four given discrete frequencies, in accordance with the combined frequency states of said sources,
four frequency selective networks coupled to said last-mentioned means for filtering out associated ones of said predetermined signal components,
four control signal sources,
and means coupled to said frequency selective networks and said control signal sources for converting the frequency of said filtered signal component, which is produced in response to the coincident presence of said second stable frequency at the outputs of both said information signal sources, to said second stable frequency, and for converting the frequencies of all of said other filtered signal components to said first stable frequency.

3. A logical switching system comprising:
two sources of information signals each of which is capable of assuming two stable frequency states which are representative of digit intelligence referenced to the base two;

means coupled to said sources for producing an output signal at one and only one of four possible different frequencies and at an associated one of four output terminals, in accordance with the instantaneous combined frequency conditions of said sources;

four frequency-selective networks coupled to said four output terminals; and means coupled to said frequency-selective networks for converting the outputs of said networks to predetermined ones of said base-two-referenced digit-representing stable frequencies associated with said sources, whereby the output of said last-mentioned means represents a predetermined switching function of the frequency conditions of said sources.

4. A logical switching system for selectively generating any basic switching function of two binary variables comprising:

two sources of information signals each capable of assuming first and second stable frequency states corresponding respectively to binary one and zero conditions;

means coupled to said sources for producing a composite signal including a predetermined frequency component at one and only one of four different given frequencies;

four frequency-selective networks coupled to said last-mentioned means for filtering out associated ones of said four predetermined frequency components;

four control-signal sources each capable of being conditioned to said first and second stable frequency states associated with said information-signal sources; and means coupled to said frequency selective networks and said control-signal sources for converting the frequency of said filtered predetermined frequency component to a predetermined one of said first and second stable frequencies in accordance with a predetermined switching function of the combined frequency conditions of said four control signals, and for transferring all such converted signals to a common output channel.

5. A selection system for coupling signals at one of four input terminals to a common output terminal in accordance with the combined conditions of two selection inputs comprising:

four sources of information signals each capable of assuming two stable frequency states;

two sources of selection-control signals each capable of assuming said two stable frequency states;

means coupled to said selection-control-signal sources for producing a composite signal including a predetermined frequency component at one and only one of four different frequencies associated in one-to-one fashion with the four possible combinations of frequency states of said two selection-control-signal sources;

means coupled to said last-mentioned means for filtering said predetermined frequency component into a corresponding predetermined one of four signal channels; and means coupled to said four information-signal sources and said four signal channels for producing an output signal at the stable frequency of said information-signal source which is coupled to said predetermined signal channel.

References Cited by the Examiner

UNITED STATES PATENTS

| | | | |
|---|---|---|---|
| 3,077,564 | 2/63 | Forrer | 328—92 |
| 3,090,923 | 5/63 | Wolff | 328—93 |

ARTHUR GAUSS, *Primary Examiner.*